United States Patent [19]
Yoshida et al.

[11] Patent Number: 5,617,472
[45] Date of Patent: Apr. 1, 1997

[54] NOISE SUPPRESSION OF ACOUSTIC SIGNAL IN TELEPHONE SET

[75] Inventors: Toshio Yoshida; Michitaka Sisido, both of Tokyo, Japan

[73] Assignee: NEC Corporation, Tokyo, Japan

[21] Appl. No.: 363,866

[22] Filed: Dec. 27, 1994

[30] Foreign Application Priority Data

Dec. 28, 1993 [JP] Japan ..................... 5-353431

[51] Int. Cl.$^6$ .................... H04M 1/00; H03B 29/00
[52] U.S. Cl. .................... 379/390; 379/389; 379/392; 381/71; 381/94
[58] Field of Search .................... 379/390, 391, 379/389, 402, 406, 410, 387, 395, 419, 433, 388; 381/94, 71, 72, 74, 430

[56] References Cited

U.S. PATENT DOCUMENTS

| | | | |
|---|---|---|---|
| 4,628,529 | 12/1986 | Borth et al. | 381/94 |
| 4,769,847 | 9/1988 | Taguchi | 379/406 |
| 5,384,843 | 1/1995 | Masuda et al. | 379/391 |
| 5,398,281 | 3/1995 | Kurokawa et al. | 379/410 |
| 5,398,282 | 3/1995 | Forrester et al. | 379/410 |

FOREIGN PATENT DOCUMENTS

| | | |
|---|---|---|
| 0595457A1 | 5/1994 | European Pat. Off. . |
| 63-191447 | 8/1988 | Japan . |
| 2095956 | 10/1982 | United Kingdom ............ 379/390 |
| 2243274 | 10/1991 | United Kingdom . |

OTHER PUBLICATIONS

British Search Report.

Primary Examiner—Thomas W. Brown
Assistant Examiner—Jacques M. Saint-Surin
Attorney, Agent, or Firm—Whitham, Curtis, Whitham & McGinn

[57] ABSTRACT

A telephone set comprises a noise detector, a noise level determining circuit, and a noise canceler. The noise detector detects a noise component from a transmitting acoustic signal by detecting signal recurrence of the transmitting acoustic signal. The noise level determining circuit determines a noise level by comparing the noise component with a first threshold. According to the noise level, the noise canoelet cancels the noise component from the transmitting acoustic signal when the noise level is not smaller than the first threshold. The telephone set further comprises a frequency characteristics controller for a received acoustic signal to obtain a desired speech articulation. The frequency characteristics controller, based on the noise level, determines a level change region, a level change value, and a level change direction of the spectrum of the received acoustic signal.

25 Claims, 7 Drawing Sheets

NOISE SUPPRESSION OF ACOUSTIC SIGNAL IN TELEPHONE SET

BACKGROUND OF THE INVENTION

1. Field of the Invention

The present invention relates to a telephone set, and more particularly to noise suppression for improved speech-quality.

2. Prior Art

Recently, a portable telephone set has been widespread with progressed mobile radio communication, and people have come to easily talk over the telephone at any place as well as specific places such as a telephone booth, etc. This is an important feature of the mobile radio telephone system. However, a noise problem arises in cases where the telephone is used in noisy surroundings.

In Japanese Patent Laid-open Publication No. SHO 63-191447, a noise suppression telephone set is disclosed. As shown in FIG. 1, the conventional telephone is provided with a noise detector 30 and a microphone 40 for detecting a noise level of the surroundings. The noise detector 30 outputs a detected noise level signal S20 to a receiver circuit 34, a filter circuit 37, and a ringing controller 39. According to the noise level signal S20, the gains of the receiver circuit 34 and the ringing controller 39 are changed, and the frequency characteristics of the filter circuit 37 are modified.

When an incoming call occurs at a line terminal 32, the ringing controller 39 generates speaker 31 to ring. Since the gain of the ringing controller 39 is changed according to the noise level signal automatically controlled in volume.

After the circuit has been established, receiving an incoming signal from a hybrid circuit 33, the receiver circuit 34 outputs a received acoustic signal S22 to a telephone receiver (or a speaker) 38 which transforms it into sound waves. Since the gain of the receiver circuit 34 is changed according to the noise level signal 820, the received acoustic signal S22 is automatically controlled in volume.

On the other hand, a telephone transmitter (or a microphone) 36 outputs a transmitting acoustic signal S23 to the filter circuit 37 comprising a high-pass filter. The cut-off frequency of the high-pass filter is changed according to the noise level signal S20 so that noise frequencies lower than the cut-off frequency, the noise having frequency characteristics similar to 1/f noise, are stopped to remove them from the transmitting acoustic signal S23. The transmitting acoustic signal S23 passing through the filter circuit 37 is sent to the line terminal 32 through a transmitter circuit 35 and the hybrid circuit 33.

In addition to the telephone transmitter 36, however, the above-mentioned telephone set necessitates the microphone 40 for detecting the surrounding noise. Furthermore the microphone 40 must be placed at a position apart from the telephone transmitter 36 so as to detect background noise only. Therefore, employing the conventional noise suppression system, it would be difficult to make the telephone set miniature and lightweight. Particularly, for a mobile telephone set, it is very important to make the telephone body small and light.

SUMMARY OF THE INVENTION

An object of the present invention is to provide a small-size telephone set capable of obtaining sufficient speech-quality even when the surrounding noise level is high.

A telephone set according to the present invention is comprised of a noise detector, a noise level determining circuit, and a noise canceler. The noise detector detects a noise component from a transmitting acoustic signal by detecting signal recurrence from the transmitting acoustic signal. The noise level determining circuit determines a noise level by comparing the noise component with a first threshold. According to the noise level, the noise canceler cancels the noise component from the transmitting acoustic signal when the noise level is not smaller than the first threshold.

The telephone set is further comprised of a frequency characteristics controller for a received acoustic signal. The frequency characteristics controller, receiving the noise level, determines a level change region, a level change value, and a level change direction based on the noise level. The level change region comprises at least one frequency region of a low frequency region smaller than a predetermined lowest frequency required to obtain a desired speech articulation and a high frequency region greater than the predetermined lowest frequency. The level change direction is determined such that the frequency spectrum of the received acoustic signal is not smaller than the noise frequency spectrum at least in the high frequency region. Based on the level region, the level change value, and the level change direction, the frequency spectrum of the received acoustic signal is modified by using a digital filter. The predetermined lowest frequency is preferably set to 1 KHz.

DETAILED DESCRIPTION OF THE PREFERRED EMBODIMENT

Figure 1:
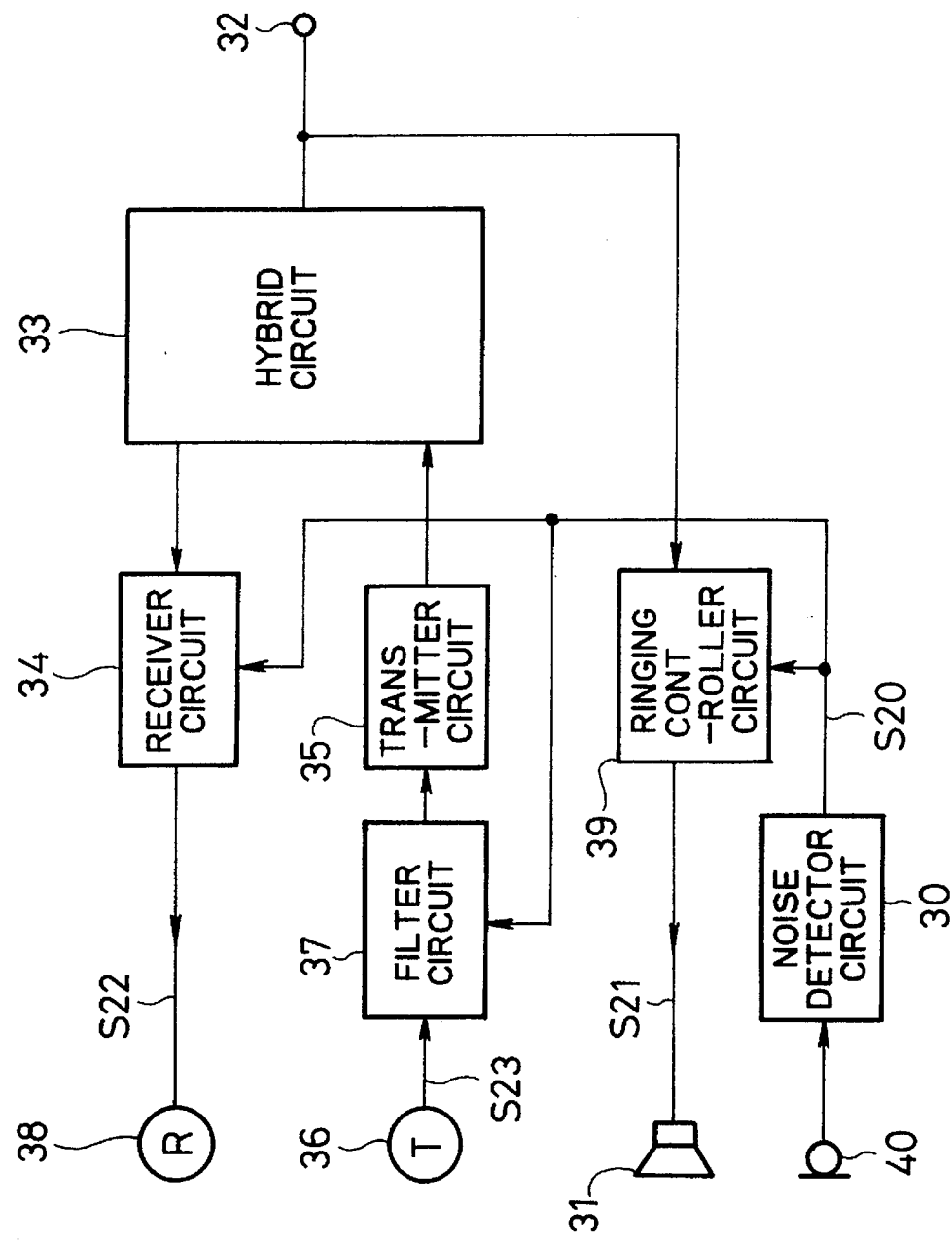
FIG. 1 is a block diagram illustrating an example of a conventional telephone set.

An embodiment according to the present invention is explained hereinafter in detail referring to the drawings.

Figure 2:
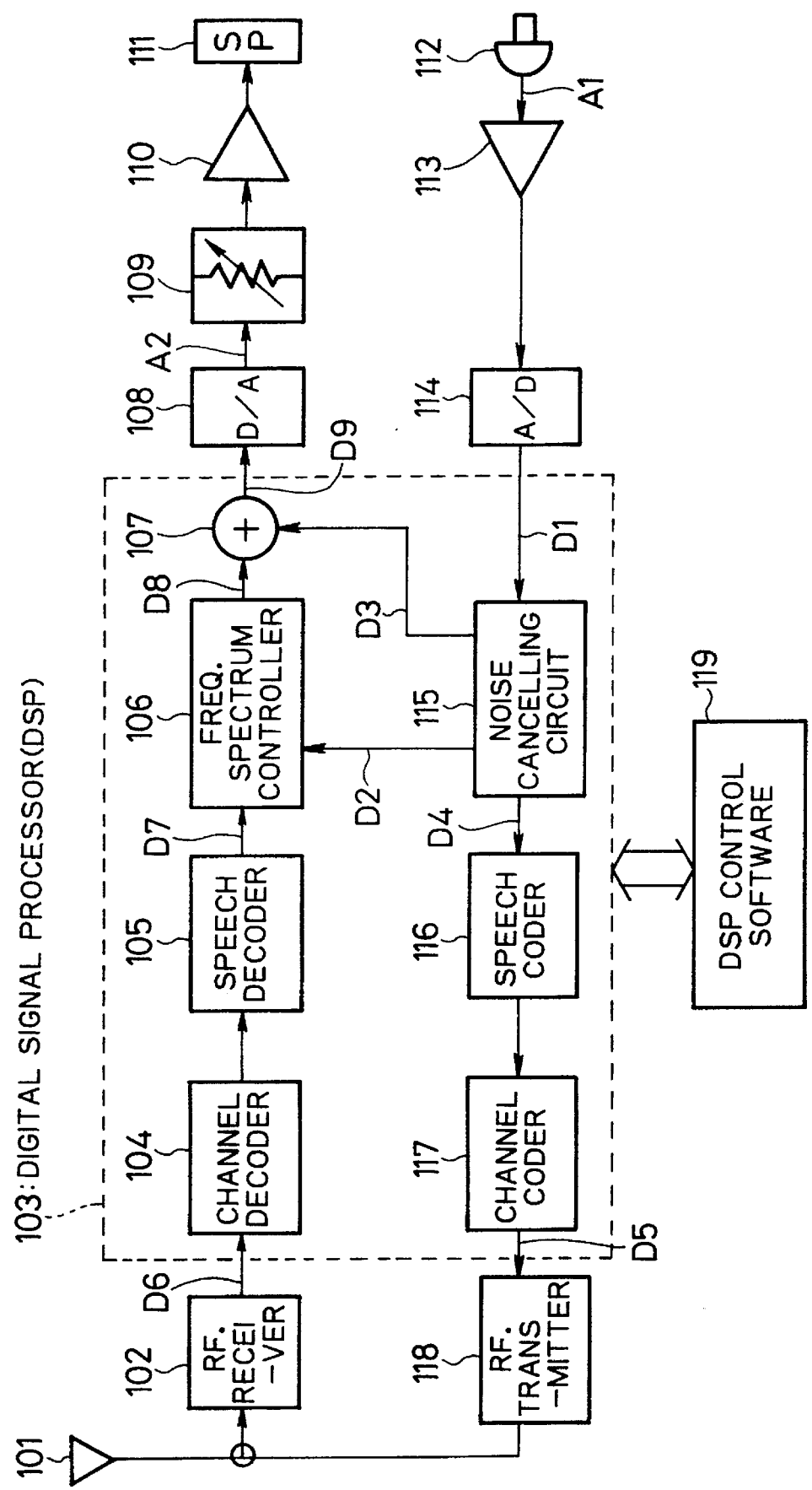
FIG. 2 is a block diagram illustrating a portable telephone set of an embodiment according to the present invention.

Referring to FIG. 2, the receiving portion of the portable telephone set is comprised of an antenna 101, a radio receiver 102, a receiving portion (104–107) of a digital signal processor (DSP) 103, a digital-to-analog (D/A) converter 10S, a volume controller 109, an amplifier 110, and a speaker 111. The transmitting portion is comprised of a microphone 112, an amplifier 113, a analog-to-digital (A/D) converter 114, a transmitting portion (115–117) of the DSP 103, and a radio transmitter 118.

The main operation of the portable telephone set is performed by the DSP 103 using its control software stored in a read-only memory 119. The receiving portion of the DSP 103 is comprised of a channel decoder 104, a speech decoder 105, a frequency spectrum controller 106, and a sidetone canceler 107. The transmitting portion is comprised of a noise cancelling circuit 115, a speech coder 116, and a channel coder 117.

The radio receiver 102 receives a radio wave through the antenna 101 and outputs a received digital signal D6 to the channel decoder 104. The received digital signal D6 is decoded by the channel decoder 104 and then is further decoded into a digital acoustic signal D7 by the speech decoder 105. The digital acoustic signal D7 is output from the speech decoder 105 to the frequency spectrum controller 106 where the frequency characteristics of the digital acoustic signal D7 are modified according to a noise level determination signal D2 received from the noise cancelling circuit 115. The sidetone canceler 107 removes a sidetone signal D3 from the output signal DS of the frequency spectrum controller 106. The sidetone suppression signal D3 is received from the noise cancelling circuit 115. The output signal D9 of the sidetone canceler 107 is converted to an analog acoustic signal A2 by the D/A converter 108 and the analog acoustic signal A2 is changed in volume by the volume controller 109 and is then converted to sound waves by the speaker 111.

On the transmitting portion, the microphone 112 converts sound waves to an analog acoustic signal A1, which is amplified by the amplifier 113 and is then converted to a digital acoustic signal D1 by the A/D converter 114. The noise cancelling circuit 115 detects a noise component from the digital acoustic signal D1 to determine a noise level of the noise component and cancels the noise component from the digital acoustic signal D1 as described in detail later. The output signal D4 of the noise cancelling circuit 115 is encoded by the speech coder 116 and the encoded signal is further encoded by the channel coder 117. The output signal D5 of the channel coder 117 is transmitted to the antenna 101 by the radio transmitter 118.

Noise cancelling circuit

Figure 3:
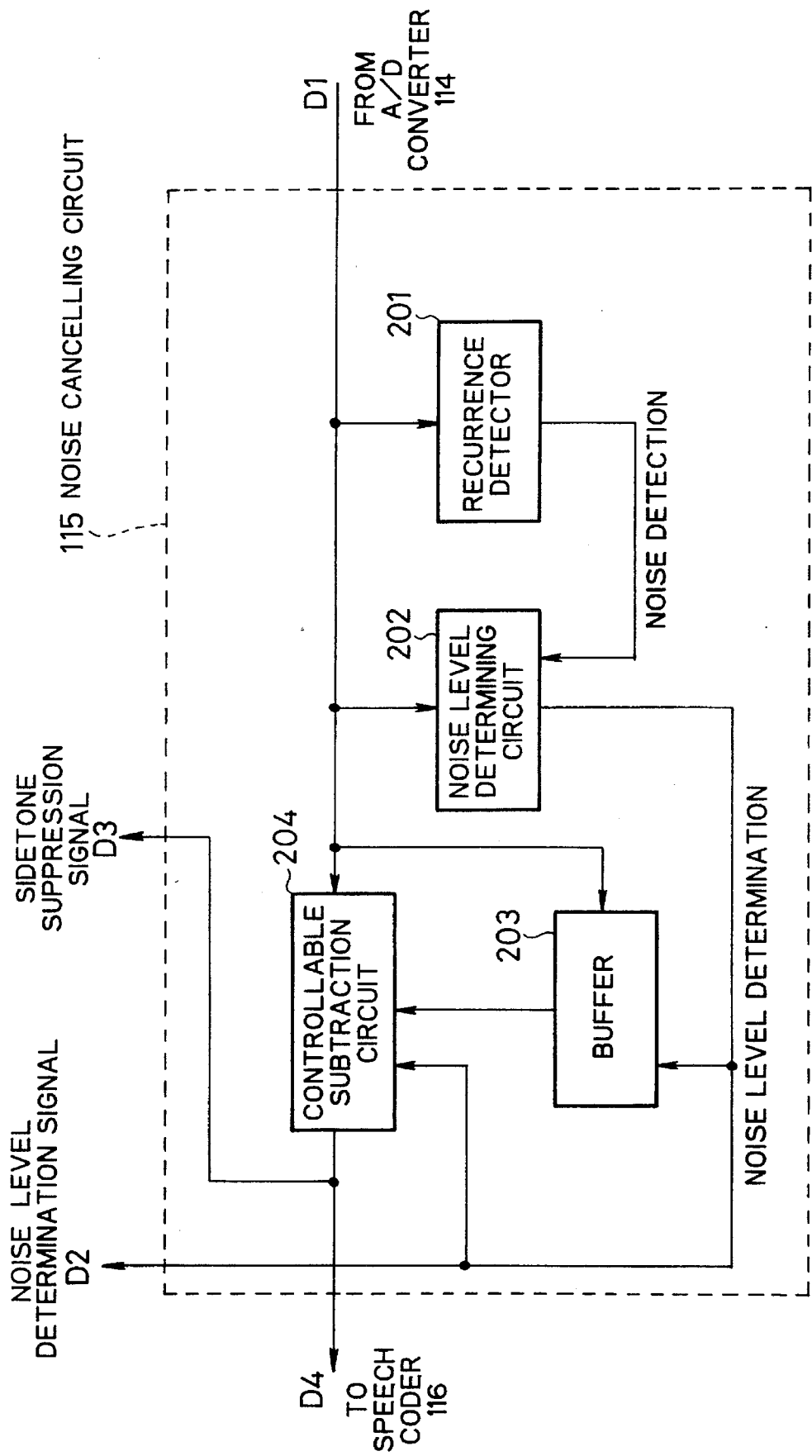
FIG. 3 is a block diagram illustrating a noise cancelling circuit of the embodiment.

As illustrated in FIG. 3, the noise cancelling circuit 115 is comprised of a recurrence detector 201, a noise level determining circuit 202, a buffer 203, and a controllable subtraction circuit 204. The recurrence detector 201 detects signal recurrence from the digital acoustic signal D1 by comparing a current acoustic signal with a preceding acoustic signal. If signal recurrence occurs, the recurrence detector outputs a noise detection signal to the noise level determining circuit 202.

Upon receipt of the noise detection signal from the recurrence detector 201, the noise level determining circuit 202 inputs the digital acoustic signal D1 at that time as a noise signal and determines the power level of the input noise signal, for example, small, medium, large, or very large. More specifically, in this embodiment, three different level thresholds are previously set in the noise level determining circuit 202. When the noise power is smaller than a low level threshold, the noise level determining circuit 202 determines the noise level to be small. When it is not smaller than the low level threshold but smaller than a high level threshold, the noise level is decided to be medium, and when it is not smaller than the high level threshold but smaller than a level limit $L_{th}$, the noise level is decided to be large, and further when exceeding the level limit $L_{th}$, the noise level is decided to be very large. The level limit $L_{th}$ is the probable greatest level of the received acoustic signal having no distortion in the volume controller 109. Such a noise level determination signal D2 indicative of a small, medium, large, or very large level of the noise is output from the noise level determining circuit 202 to the buffer 203, the controllable subtraction circuit 204, and the frequency spectrum controller 106.

The buffer 203 Is controlled by an input/output controller (not shown), and stores the digital acoustic signal D1 only when the noise level determination signal D2 indicates a medium, large, or very large level. In other words, when the noise level exceeds the low level threshold, the buffer 203 is updated at all times.

The controllable subtraction circuit 204 performs a subtraction operation such that the noise signal stored in the buffer 203 is subtracted from the digital acoustic signal D1 according to the noise level determination signal D2. More specifically, the subtraction operation is performed when the noise level determination signal D2 indicates a medium, large, or very large level, and is not performed when a small level. The output signal D4 of the controllable subtraction circuit 204 is output as a transmitting acoustic signal to the speech coder 116 end as a sidetone suppression signal D3 to the sidetone canceler 107.

Frequency spectrum controller

Figure 4:
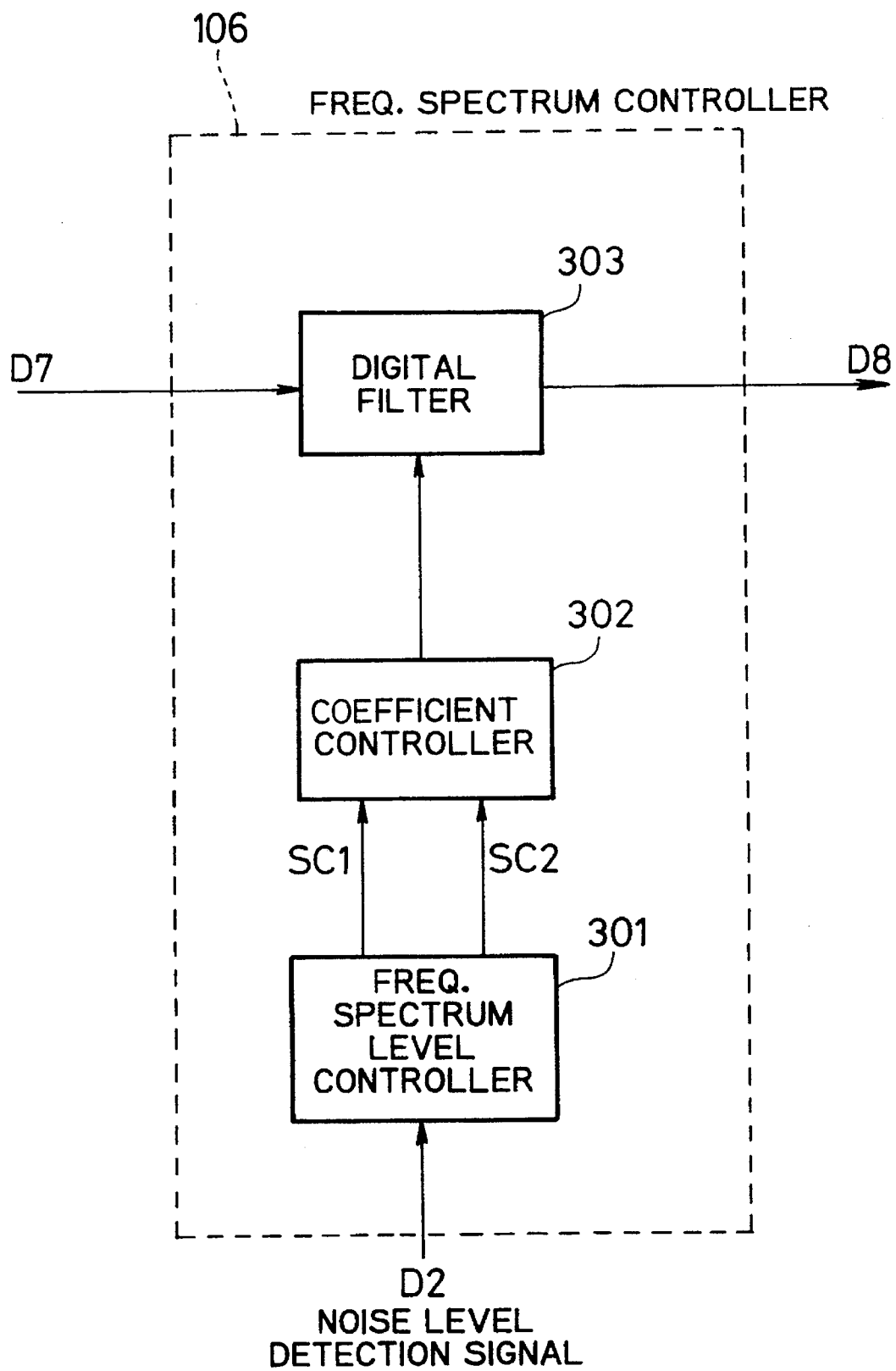
FIG. 4 is a block diagram illustrating a frequency spectrum controller of the embodiment.

As shown in FIG. 4, the frequency spectrum controller 106 is comprised of a frequency spectrum level controller 301, a coefficient controller 302, and a digital filter 303. The frequency spectrum level controller 301 receives the noise level determination signal D2 from the noise cancelling circuit 115. Depending on the noise level determination signal D2, the frequency spectum level controller 301 outputs a control signal SC1 of a frequency region lower than a required lowest frequency Af and a control signal SC2 of a frequency region higher than the required lowest frequency Af (see FIG. 7). The coefficient controller 302 changes the filter coefficients of the digital filter 303 according to the level control signals SC1 and SC2 to improve speech articulation.

The required lowest frequency Af is the lowest limit frequency of a frequency region required to obtain an articulation of 70% or more. According to this embodiment, Af is set to 1 kHz. This required lowest frequency Af can be mostly set to 1 kHz, but may be sometimes set to a frequency higher or lower than 1 kHz, depending on the magnitude of ambient noise or its frequency spectrum.

Operation of the embodiment

Figure 5:
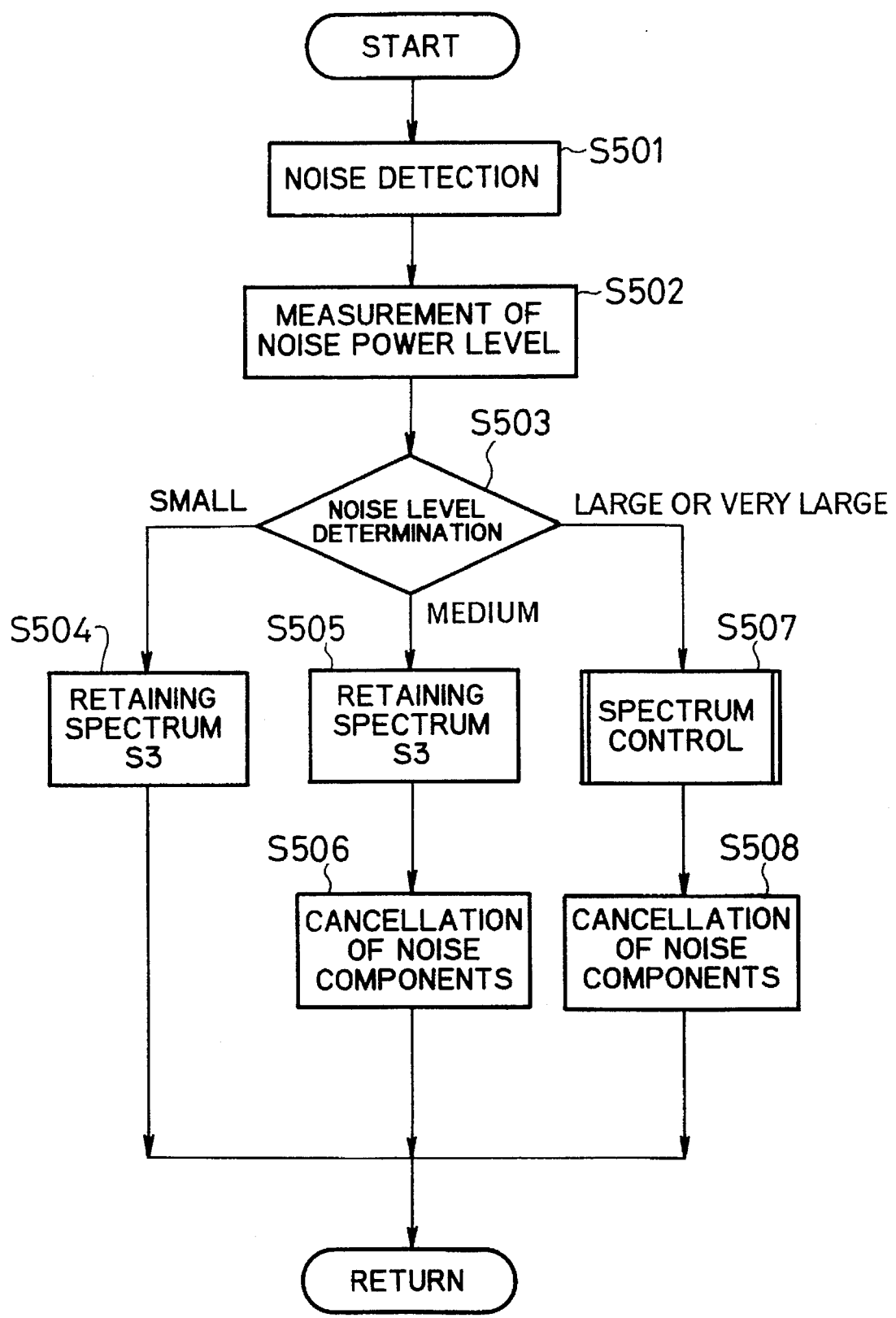
FIG. 5 is a flowchart illustrating an operation of the embodiment.

Referring to FIG. 5, when noise is detected from the digital acoustic signal D1 by the recurrence detector 201 (S501), the noise level determining circuit 202 measures the noise power level (S502), determines the magnitude of the noise level, and outputs the noise level determination signal D2 (S503).

If the noise level is decided to be small, the frequency spectrum level controller 301 outputs the control signals SC1 and SC2 to the coefficient controller 302 which adjusts the coefficients of the digital filter 303 such that the spectrum of the received acoustic signal D8 is retained at the equalized spectrum S3 (S504). At the same time, the controllable subtraction circuit 204 subtracts nothing from the digital acoustic signal D1 to output it to the speech coder 116.

If the noise level is decided to be medium, the frequency spectrum controller 106 is also operated as described above (S505), and the controllable subtraction circuit 204 subtracts the noise component stored in the buffer 203 from the digital acoustic signal D1 (S506).

If the noise level is decided to be large or very large, the frequency spectrum controller 106 performs the spectrum control as described later (S507), and the controllable subtraction circuit 204 subtracts the noise component stored in the buffer 203 from the digital acoustic signal D1 (S508).

Next, frequency characteristics control (S507) of the received acoustic signal is concretely explained, referring to FIGS. 4–7.

Figure 6:
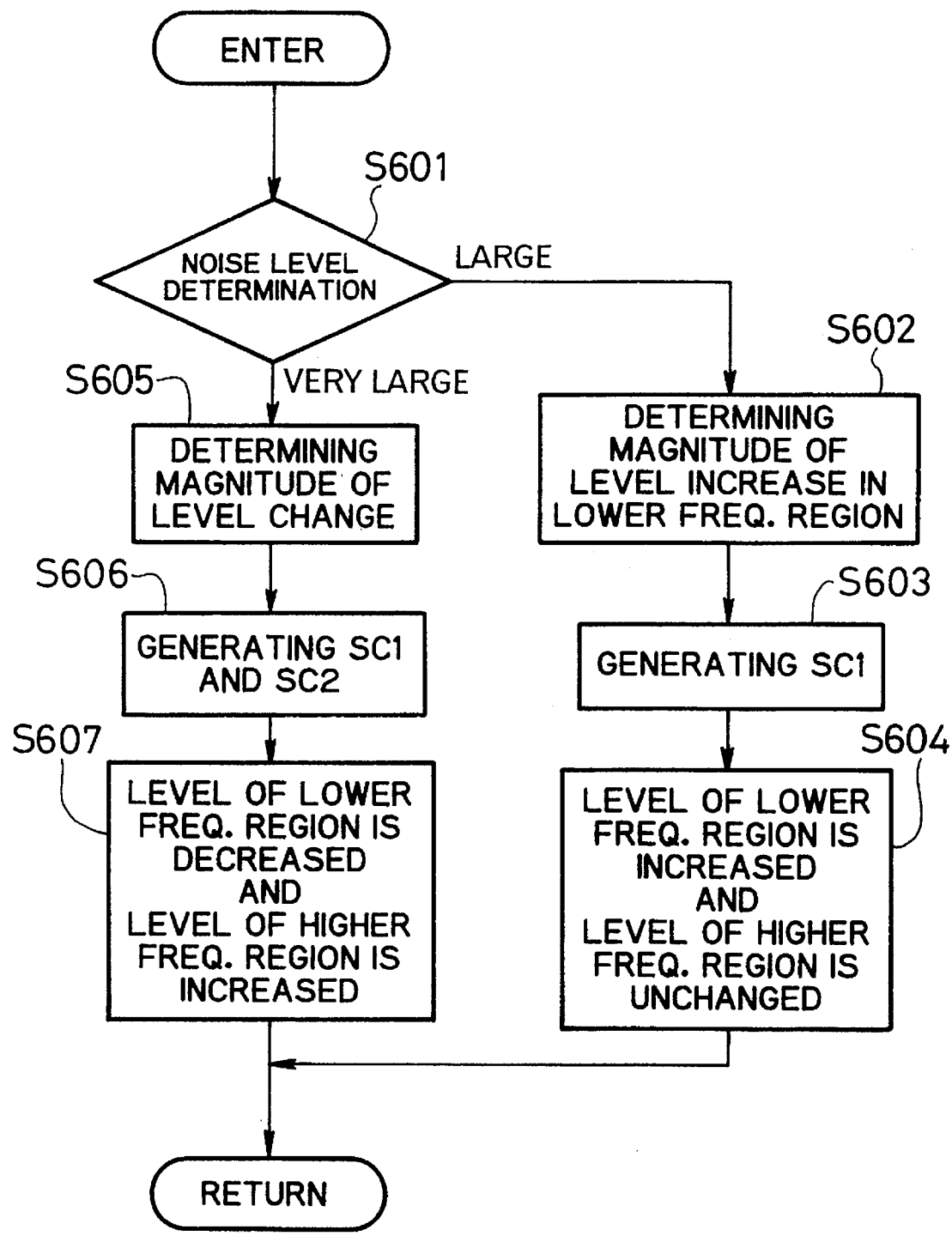
FIG. 6 is a flowchart illustrating a spectrum control routine of FIG. 5.

As shown in FIG. 6, if the noise level is large (S601), the frequency spectrum level controller 301 determines the magnitude of a level increase so that the received acoustic signal D7 can be increased in level up to a level greater than the noise level in the frequency region lower than the required lowest frequency Af (S602) and generates the level increase control signal SC1 for the frequency region lower than the frequency Af (S603). According to the control signal SC1, the coefficient controller 302 modifies the filter coefficients of the digital filter 303 such that the spectrum level of the received acoustic signal D8 is increased up to over the noise spectrum level in the lower frequency region and is unchanged in the higher frequency region (S604).

On the other hand, if the noise level is very large (S601) the frequency spectrum level controller 301 determines that the current noise level can not be coped with by increasing the spectrum level of the lower frequency region. In this case, it ignores the primary voice format frequency region, and increases the spectrum level of the higher frequency region required to obtain the speech articulation. That is to say, the frequency spectrum level controller 301 determines the magnitude of a level change so that the received acoustic signal D7 can be increased in level up to over the noise level in the higher frequency region (S605). This level change value can be also used as the level decrease value of the received acoustic signal in the lower frequency region. According to the magnitude of the level change, the frequency spectrum level controller 301 generates the control signal SC1 for lowering the spectrum level in the lower frequency region and the control signal SC2 for increasing the spectrum level in the higher frequency region, and outputs these two control signals to the coefficient controller 302. As a result, since the spectrum level of the received acoustic signal D7 is increased in the frequency region higher than the required lowest frequency Af and is decreased in the frequency region lower than the frequency Af, the predetermined articulation is ensured and the consumption power is not increased.

Figure 7:
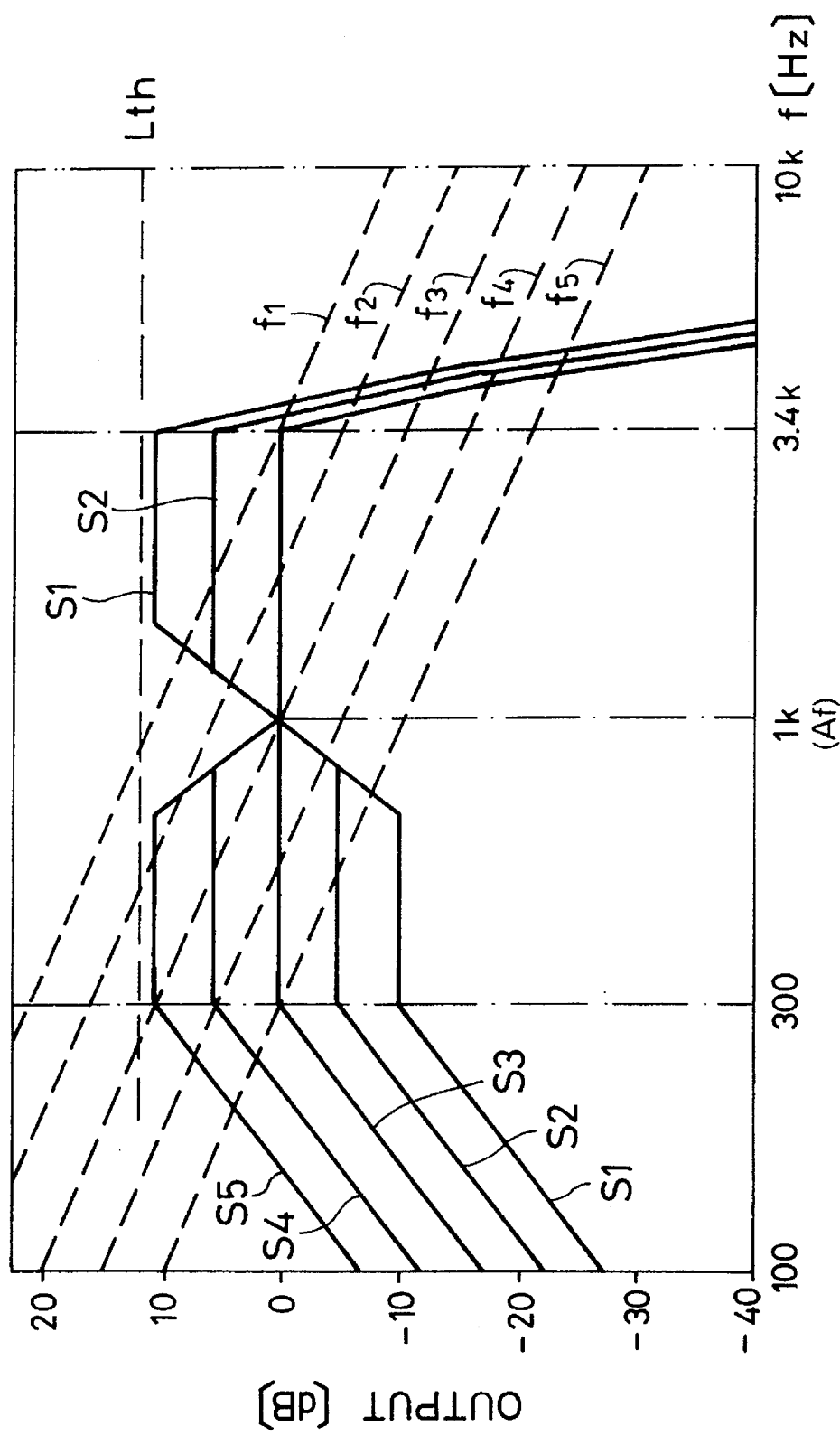
FIG. 7 is e graph showing the amplitude distribution of received acoustic signal spectrum and noise spectrum in the embodiment.

FIG. 7 is a graph showing amplitude distributions of received acoustic signal spectrum and noise spectrum when the noise level is large or very Large. In the figure, reference symbols f1 to f5 indicate general amplitude distributions of 1/f noise spectra, and the noise level is decreasing from the reference symbol f1 to the reference symbol f5. Reference symbol S1 to S5 indicate amplitude distributions of received acoustic signal spectra, and the symbol S3 indicates an equalized spectrum of the received acoustic signal D8, and the other symbols indicate spectra of received acoustic signals after their frequency spectrum levels are controlled. In FIG. 7, however, the frequency bandwidth should be set to 300 Hz to 3.4 kHz.

The control of the spectrum of the received acoustic signal D7 is performed such that the articulation of received speech can be improved. Therefore, it is very important to adjust the frequency spectrum level so that any received acoustic signal spectrum can be greater than the noise level particularly in the higher frequency region including frequencies higher than 1 kHz required to obtain a specific speech articulation.

First, when the noise has a spectrum distribution indicated by reference symbol f3, the received acoustic signal spectrum S3 has been masked by the noise f3 in the region lower than 1 kHz. That is to say, in the frequency region between 1 kHz and 3.4 kHz which is related to the specific articulation, the level of received acoustic signal spectrum S3 is higher than that of the noise spectrum f3, but in the frequency region between 300 Hz and 1 kHz, it is lower than the level of noise spectrum f3. Sinus the greatest level difference between the noise spectrum f3 end the received acoustic signal spectrum S3 is smaller than the level change limit Lth, the level of the received acoustic signal spectrum S3 in the lower region should be increased up to a noise level at the lowest frequency of 300 Hz of the frequency bandwidth, as shown by reference symbol S5. In this figure, the level increase value is 10 dB.

Depending on the level increase value, the frequency spectrum level controller 301 outputs the level control signal SC1 to the coefficient controller 302, which modifies the filter coefficients of the digital filter 303 to obtain a received acoustic signal spectrum distribution shown by the reference symbol 85. In other words, the level control signal SC1 causes the received acoustic signal spectrum in the range from 300 Hz to 1 kHz to be increased by 10 dB, i.e., to be higher than the noise spectrum f3. On the other hand, the received acoustic signal spectrum in the high frequency region ranging from 1 kHz to 3.4 kHz is unchanged (S604 in FIG. 6).

If the ambient noise is decreased in level to the noise spectrum distribution indicated by reference symbol f4, only a part of the lower frequency region of the received acoustic signal spectrum S3 is masked. Therefore, the frequency spectrum level controller 301 increases the received acoustic signal spectrum S3 up to the noise level at the lowest frequency of 300 Hz to obtain the spectrum distribution indicated by reference symbol S4. In the figure, the level increase value is 5 dB.

When the ambient noise increases in level and exceeds a predetermined level difference, specifically the greatest level difference between the noise spectrum f2 and the received acoustic signal spectrum S3 exceeds the level change limit Lth, the frequency spectrum level controller 301 increases the received acoustic signal spectrum in the higher frequency region between 1 kHz and 3.4 kHz, but lowers it in the lower frequency region between 300 Hz and 1 kHz by the same value as the level increase value. This level change value is determined so that the received acoustic signal spectrum can be greater than the noise spectrum f2 in the higher frequency region. The level change value for the noise spectrum f2 is approximately 5 dB. Therefore, the received acoustic signal spectrum level in the higher frequency region is increased by 5 dB and that in the lower frequency region is decreased by 5 dB. At the result, the spectrum distribution indicated by reference symbol S2 is obtained. Similarly, the level change value for the noise spectrum f1 is 10 dB, and the received acoustic signal spectrum distribution is indicated by reference symbol 51 (S607 in FIG. 6).

As described above, according to the present invention, when the noise level is not small, the noise component is subtracted from the digital acoustic signal D1 by the noise cancelling circuit 115. Moreover, when the noise level exceeds the level limit $L_{th}$ as is shown by the noise spectra f1 and f2 in FIG. 7, since the received acoustic signal spectrum level in the lower frequency region is decreased and that in the higher frequency region is increased, energy can be concentrated on ensuring the articulation. Therefore, under high level noises, people can talk over the telephone with sufficient speech articulation and further its power consumption is not increased as well.

What is claimed is:

1. A telephone set comprising:

a telephone transmitter for converting a sound wave to a transmitting acoustic signal;

a telephone receiver for converting a received acoustic signal to a sound wave;

noise detecting means for detecting a noise component from the transmitting acoustic signal;

noise level determining means for determining a noise level by comparing a power level of the noise component with a first threshold; and noise cancellation means for canceling the noise component from the transmitting acoustic signal when the noise level is not smaller than the first threshold, said noise cancellation means comprising:

storage means for storing the noise component when the noise level is not smaller than the first threshold; and subtraction means for subtracting the noise component stored in the storage means from the transmitting acoustic signal when the noise level is not smaller than the first threshold.

2. The telephone set according to claim 1, wherein the noise detecting means comprises recurrence detecting means for detecting signal recurrence of the transmitting acoustic signal by comparing a current transmitting acoustic signal with a preceding transmitting acoustic signal.

3. The telephone set according to claim 1, further comprising:

determination means for determining a level change region, a level change value, and a level change direction based on the noise level when the noise level is not smaller than a second threshold greater than the first threshold, the level change region comprising at least one frequency region of a low frequency region smaller than a predetermined lowest frequency required to obtain a desired speech articulation and a high frequency region greater than the predetermined lowest frequency, the level change direction being determined such that the frequency spectrum of the received acoustic signal is not smaller than the noise frequency spectrum at least in the high frequency region; and modifying means for modifying the frequency spectrum of the received acoustic signal based on the level region, the level change value, and the level change direction.

4. The telephone set according to claim 3, wherein the predetermined lowest frequency is 1 KHz.

5. The telephone set according to claim 3, wherein the modifying means comprises a digital filter in which filter coefficients are variable, the filter coefficients being modified based on the level region, the level change value, and the level change direction.

6. The telephone set according to claim 1, further comprising sidetone cancellation means for canceling sidetone from the received acoustic signal by using the transmitting acoustic signal output from the noise cancellation means as a sidetone suppression signal.

7. The telephone set according to claim 3, further comprising sidetone cancellation means for canceling sidetone from the received acoustic signal by using the transmitting acoustic signal output from the noise cancellation means as a sidetone suppression signal.

8. A method for suppressing noise in a telephone set comprising a telephone transmitter for converting a sound wave to a transmitting acoustic signal and a telephone receiver for converting a received acoustic signal to a sound wave, the method comprising the steps of:

detecting a noise component from the transmitting acoustic signal;

determining a noise level by comparing a power level of the noise component with a first threshold;

canceling the noise component from the transmitting acoustic signal when the noise level is not smaller than the first threshold;

determining a level change region and a level change value based on the noise level when the noise level is not smaller than a second threshold greater than the first threshold, the level change region comprising at least one frequency region of a low frequency region smaller than a predetermined lowest frequency required to obtain a desired speech articulation and a high frequency region greater than the predetermined lowest frequency;

determining a level change direction based on the noise level when the noise level is not smaller than the second threshold, such that the frequency spectrum of the received acoustic signal is not smaller than the noise frequency spectrum at least in the high frequency region; and modifying the frequency spectrum of the received acoustic signal based on the level change region, the level change value, and the level change direction.

9. The method according to claim 8, wherein the predetermined lowest frequency is 1 KHz.

10. An apparatus for suppressing noise comprising:

means for inputting an acoustic signal to be transmitted;

means, operatively connected to said inputting means, for detecting a recurrence of said acoustic signal to be transmitted as a noise signal, said recurrence detecting means including means for outputting a noise detection signal;

means, operatively connected to said recurrence detecting means and said inputting means, for determining a level of said noise signal when said recurrence detecting means outputs said noise detection signal, said level determining means including means for outputting a noise level signal; and means, operatively connected to said level determining means and said inputting means, for storing said noise signal when said noise level signal has a predetermined value.

11. An apparatus as in claim 10, further comprising means, operatively connected to said inputting means, said level determining means and said storing means, for subtracting said noise signal from said acoustic signal to be transmitted when said noise level signal has said predetermined value.

12. An apparatus as in claim 10, further comprising:

means, operatively connected to said level determining means, for suppressing a side-tone of a received acoustic signal, wherein said side-tone suppressing means suppresses said side-tone of said received acoustic signal based on said noise level signal.

13. An apparatus as in claim 10, further comprising:

means, operatively connected to said level determining means, for filtering a received acoustic signal, wherein said filtering means adjusts said received acoustic signal based on said noise level signal.

14. An apparatus for suppressing noise comprising:

means for inputting an acoustic signal to be transmitted;

means, operatively connected to said inputting means, for detecting a recurrence of said acoustic signal to be transmitted as a noise signal, said recurrence detecting means including means for outputting a noise detection signal;

means, operatively connected to said recurrence detecting means and said inputting means, for determining a level of said noise signal when said recurrence detecting means outputs said noise detection signal, said level determining means including means for outputting a noise level signal;

means, operatively connected to said level determining means and said inputting means, for storing said noise signal when said noise level signal has a predetermined value; and means, operatively connected to said level determining means, for filtering a received acoustic signal, wherein said filtering means adjusts said received acoustic signal based on said noise level signal, said noise level signal having one of a first level signal and a second level signal, said received acoustic signal including a first acoustic frequency range and a second acoustic frequency range;

said first acoustic frequency range including a first amplitude and said second acoustic frequency range includes a second amplitude, wherein when said noise level signal has said first level signal, said filtering means increases said first amplitude; and when said noise level signal has said second level signal, said filtering means decreases said first amplitude and increases said second amplitude.

15. An apparatus as in claim 14, further comprising means, operatively connected to said level determining means and said filtering means, for controlling a frequency level, wherein when said noise level signal has said first level signal, said frequency controlling means outputs a first frequency control signal to said filtering means, and when said noise level signal has said second level signal, said frequency controlling means outputs said first frequency control signal and a second frequency control signal to said filtering means.

16. An apparatus as in claim 15, wherein said first frequency control signal and said second frequency control signal each comprise amplitude adjustment information and said filtering means adjusts said received acoustic signal based on said first frequency control signal and said second frequency control signal.

17. An apparatus as in claim 14, wherein said first acoustic frequency range includes acoustic signals within a range of 1 kHz to 3.4 kHz and said second acoustic frequency range includes acoustic signals within a range of 300 Hz to 1 kHz.

18. A method for suppressing noise, comprising the steps of:

inputting an acoustic signal to be transmitted;

detecting a recurrence of said acoustic signal to be transmitted as a noise signal and outputting a noise detection signal;

determining a level of said noise signal in response to said noise detection signal and outputting a noise level signal;

storing said noise signal when said noise level signal has a predetermined value; and filtering a received acoustic signal by adjusting said received acoustic signal based on said noise level signal, wherein said noise level signal has one of a first level signal and a second level signal, said received acoustic signal including a first acoustic frequency range and a second acoustic frequency range, said first acoustic frequency range including a first amplitude and said second acoustic frequency range including a second amplitude, wherein when said noise level signal has said first level signal, said step of filtering includes increasing said first amplitude, and when said noise level signal has said second level signal, said step of filtering includes decreasing said first amplitude and increasing said second amplitude.

19. A method as in claim 18, further comprising the steps of controlling a frequency level, providing a first frequency control signal for controlling said step of filtering when said noise level signal has said first level signal, and providing said first frequency control signal and a second frequency control signal for controlling said step of filtering when said noise level signal has said second level signal.

20. A method as in claim 19, wherein steps of providing said first frequency control signal and said second frequency control signal each comprise providing amplitude adjustment information, and said step of filtering includes adjusting said received acoustic signal based on said first frequency control signal and said second frequency control signal.

21. A method as in claim 18, wherein said first acoustic frequency range includes acoustic signals within a range of 1 kHz to 3.4 kHz and said second acoustic frequency range includes acoustic signals within a range of 300 Hz to 1 kHz.

22. A telephone, comprising:

means for inputting an signal to be transmitted;

means, operatively connected to said inputting means, for detecting a recurrence of said signal to be transmitted as a noise signal, said recurrence detecting means including means for outputting a noise detection signal;

means, operatively connected to said recurrence detecting means and said inputting means, for determining a level of said noise signal when said recurrence detecting means outputs said noise detection signal, said level determining means including means for outputting a noise level signal;

means, operatively connected to said level determining means and said inputting means, for storing said noise signal when said noise level signal has a predetermined value; and means, operatively connected to said level determining means, for filtering a received signal, wherein said filtering means adjusts said received signal based on said noise level signal, said noise level signal has one of a first level signal and a second level signal;

said received signal includes a first frequency range and a second frequency range;

said first frequency range includes a first amplitude and said second frequency range includes a second amplitude;

wherein when said noise level signal has said first level signal, said filtering means increases said first amplitude; and when said noise level signal has said second level signal, said filtering means decreases said first amplitude and increases said second amplitude.

23. A telephone as in claim 22, further comprising means, operatively connected to said level determining means and said filtering means, for controlling a frequency level, wherein when said noise level signal has said first level signal, said frequency controlling means outputs a first frequency control signal to said filtering means, and when said noise level signal has said second level signal, said frequency controlling means outputs said first frequency control signal and a second frequency control signal to said filtering means.

24. A telephone as in claim 23, wherein said first frequency control signal and said second frequency control signal each comprise amplitude adjustment information and said filtering means adjusts said received signal based on said first frequency control signal and said second frequency control signal.

25. A telephone as in claim 22, wherein said first frequency range includes signals within a range of 1 kHz to 3.4 kHz and said second frequency range includes acoustic signals within a range of 300 Hz to 1 kHz.

* * * * *